(12) United States Patent
Gnanasabapathy et al.

(10) Patent No.: US 7,444,476 B2
(45) Date of Patent: Oct. 28, 2008

(54) SYSTEM AND METHOD FOR CODE AND DATA SECURITY IN A SEMICONDUCTOR DEVICE

(75) Inventors: Thiru Gnanasabapathy, Sugar Land, TX (US); David P. Foley, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1016 days.

(21) Appl. No.: 10/157,552

(22) Filed: May 29, 2002

(65) Prior Publication Data

US 2003/0023871 A1      Jan. 30, 2003

Related U.S. Application Data

(60) Provisional application No. 60/307,683, filed on Jul. 24, 2001.

(51) Int. Cl.
G06F 12/00     (2006.01)
H04L 9/32      (2006.01)
G06F 15/16     (2006.01)
G06F 13/26     (2006.01)
G06F 13/372    (2006.01)
G06F 13/38     (2006.01)
G06F 15/177    (2006.01)

(52) U.S. Cl. .................. 711/141; 711/143; 711/144
(58) Field of Classification Search .............. 726/2, 726/5, 17, 27, 34; 713/186; 711/141, 143, 711/144
See application file for complete search history.

(56) References Cited

U.S. PATENT DOCUMENTS 5,293,424 A * 3/1994 Holtey et al. ............ 713/193
6,032,229 A * 2/2000 Hotta et al. ............. 711/144
6,460,139 B1 * 10/2002 Heinrich et al. ........... 726/17
6,754,784 B1 * 6/2004 North et al. ............. 711/145
6,915,247 B1 * 7/2005 Aguro ..................... 713/189

FOREIGN PATENT DOCUMENTS

JP         2002082902 A *  3/2002

OTHER PUBLICATIONS

G. Edward Suh, Charles W. O'Donnell, Ishan Sachdev, Srinivas Devadas, "Design and Implementation of the AEGIS Single-Chip Secure Processor Using Physical Random Functions", May 2005, ACM SIGARCH Computer Architecture news, vol. 33 Issue 2, pp. 1-12.*
English Translation of JP 2002082902 A has been provided on Jul. 1, 2008, pp. 1-7.*

* cited by examiner

*Primary Examiner*—Matthew Smithers
*Assistant Examiner*—Courtney D Fields
(74) *Attorney, Agent, or Firm*—Robert D. Marshall, Jr.; W. James Brady; Frederick J. Telecky, Jr.

(57) ABSTRACT

A system and method for preventing unauthorized access to the software of a semiconductor device is provided. The semiconductor device of the present invention includes a memory buffer in the data path between the processor core of the device and the memory of the device. A password for providing full communication in the data path is stored in a defined location in the memory. Upon reading the memory location, the password is provided to a code security module. The password provided to the code security module is compared to a data string provided by the user. If the password and the data string match, the password data path is open for communication between the memory and the processor core. If the password and data string do not match, the password data path is closed to communication between the memory and the processor core.

24 Claims, 1 Drawing Sheet

SYSTEM AND METHOD FOR CODE AND DATA SECURITY IN A SEMICONDUCTOR DEVICE

This application claims priority under 35 USC §119(e)(1) of Provisional Application No. 60/307,683, filed Jul. 24, 2001.

BACKGROUND OF THE INVENTION

This invention relates in general to the field of semiconductor devices and more particularly to an apparatus for providing security for memory or other elements in a semiconductor device.

BACKGROUND OF THE INVENTION

Application software for a digital signal processor or any other semiconductor device having an embedded processor may be stored in the on-chip flash or ROM memory of the device. Because the application software may have value, access to the application software should be restricted. In many applications, there is an increasing need to have code security once the application code is fully developed and released to production. In this instance, security is defined with respect to read access to on-chip program memory. If access to the application software of the device by components of the semiconductor device, other than the processor core, is not restricted, there is a possibility that a customer of the device may be able to alter or copy the proprietary application software stored in on-chip memory. Unauthorized alterations to the application software of a semiconductor device may negatively affect the operation of the device. Unauthorized copying of the application software of the device may permit a customer or user of the device to copy the application software or algorithms stored in the semiconductor device to other semiconductor devices or applications.

One potential solution to the problem of unauthorized access to the application software of the device involves physically or logically sealing the device once the application software has been loaded to the on-chip memory of the device. Although this technique prevents unauthorized access to the application software of the device, this technique necessarily also prevents authorized access, necessarily preventing both unauthorized and authorized users from altering the application software. Once a device has been sealed, the manufacturer cannot communicate with the program space of the device to perform failure analysis or other debugging functions. An irreversible security scheme will prevent any changes to the software of the program space.

SUMMARY OF THE INVENTION

Accordingly, a need has arisen for a method and apparatus for securing the memory of a semiconductor device. In accordance with the teachings of the present invention, a method and apparatus for securing the memory of a semiconductor device that substantially eliminates or reduces the disadvantages and problems associated with prior techniques.

According to one embodiment of the present invention, a semiconductor device, such as a digital signal processor (DSP), includes a memory buffer between the processor core and the on-chip or local memory of the device. The memory buffer receives a signal from a security module. When the device is placed in a secure mode, data cannot be passed from the memory to the processor core. A password is included in a defined location in the memory. To place the semiconductor device in an unsecure mode, thereby allowing communication between the memory and the processor core, the processor core must first execute a read of the location in memory that includes the password data. This data is copied to a register, sometimes referred to as a lock register, of the code security module. The contents of the lock register are compared to the contents of a second register, referred to as a key register. The contents of the key register may be specified by the user. If the contents of the lock register are identical to the contents of the key register, the semiconductor device is placed in an unsecure state, permitting data to be transferred from the memory of the device to the processor core of the device.

An important technical advantage of the present invention is the security and protection of the software stored on the memory of the semiconductor device. The security protocol of the present invention prevents unauthorized access to the memory of the semiconductor device. Another technical advantage of the present invention is that access to the software of the memory of the semiconductor device is permitted for those with password access to the device. Thus, a user who is designing or debugging the software of the device and who has access to the required security password may alter or copy the software of the memory of the device. Thus, although the memory of the semiconductor device is protected by the security protocol provided herein, the security system permits access to authorized users.

Another important technical advantage of the present invention is the security system and method disclosed herein prevents access to the memory of the semiconductor device while allowing access to the remainder of the device. Therefore, even though the memory of the device cannot be accessed during those periods during which access is restricted, the remainder of the device is operable, allowing the remainder of the device to be debugged using a JTAG or similar link.

Another significant technical advantage of the present invention is a system and method for securing a semiconductor device that involves the placement of a security checkpoint between the processor core of the device and the on-chip memory of the device. The security checkpoint establishes a secure data path between the processor core of the device and the on-chip memory of the device. As such, there is only a single data path between the processor core and the on-chip memory of the device. The location of a security checkpoint along this path permits other components of the semiconductor device to be placed opposite the processor core on the secure data path, thereby enabling these components to be placed secured along with the on-chip memory of the semiconductor device.

BRIEF DESCRIPTION OF THE DRAWINGS

A more complete understanding of the present invention may be acquired by referring to the accompanying figures in which like reference numbers indicate like features and wherein.

DETAILED DESCRIPTION OF THE INVENTION

The present invention involves a security scheme for restricting access to the content of the program space or other memory space of a semiconductor device having an on-chip or embedded processor. The security scheme involves the monitoring of the data path between the on-chip memory space and the embedded processor. The data path is blocked except during authorized periods, such as during application mode when the processor core executes the software in the on-chip memory. A semiconductor device having the disclosed security scheme is described as being secure when the data path between the processor core and the memory space is blocked. As such, during secure mode, the processor core cannot conduct read or write operations to the memory of the semiconductor device, and neither can JTAG or other external debugging tools access the protected memory space of the semiconductor device. When the semiconductor device of the present invention is in an unsecure mode, read access by the processor core to the memory space of the device is not blocked. As such, the data path between the processor core and memory is open. The security scheme of the present invention is password-based, involving the comparison of two registers stored in the memory of the semiconductor device.

Figure 1:
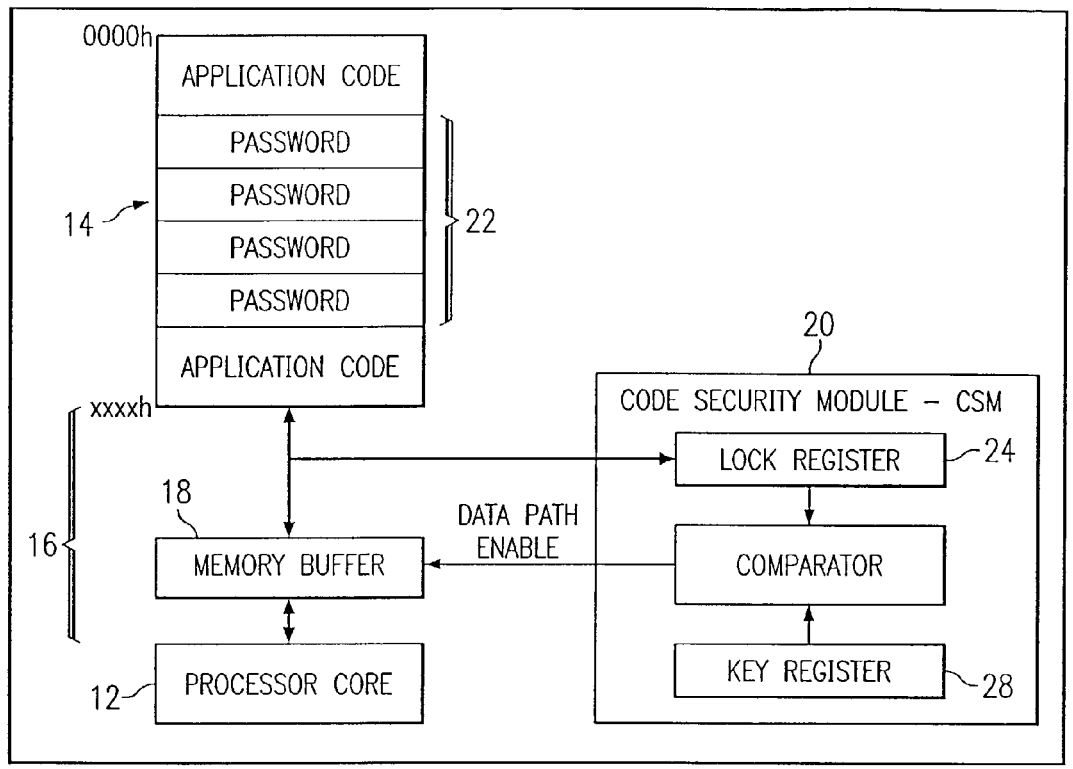
FIG. 1 is a functional block diagram of the software security components of a digital signal processor.

Shown in FIG. 1 is a functional block diagram of a digital signal processor (DSP), which is indicated generally at 10. DSP 10 includes a processor core 12 and an on-chip memory space 14. The on-chip memory space may be on-chip ROM, flash memory, or some other form of local memory. Memory space 14 is non-volatile memory and is distinguished from on-chip RAM, which is volatile and is not shown in FIG. 1. Between processor core 12 and memory space 14 is a data path 16, which includes a memory buffer 18. Memory buffer 18 communicates between the processor core 12, memory space 14, and a code security module 20. Memory 14 includes password registers 22, which are dedicated memory locations for storing the password of the software security scheme.

In the example of FIG. 1, the password registers 22 of memory space 14 are comprised of four words of data. In flash devices, the password bits of password registers 22 are chosen by the user and may be changed at the discretion of the user. In ROM devices, the password bits of password registers 22 are also customer specified, but cannot be changed following the manufacture of the device. If all the bits of password registers 22 are ones, the device will, as a default condition, be unsecure. Because erased flash devices are generally reset as all ones, these devices will initially be unsecure following an erase of flash memory. The security protocol can be implemented such that any combination of ones and zeros can serve as a default condition for a secure or an unsecure condition. For example, in one implementation, if the password registers 22 are all ones, the device will be unsecure, and if the password registers 22 are all zeros, the device will be secure. As a second implementation, if the password registers 22 are all ones or all zeros, the device will be unsecure.

The function of code security module 20 is to provide a signal to memory buffer 18 that identifies to memory buffer 18 when data may pass from memory 14 to processor core 12. When the code security password is read from password registers 22 of memory 14, a copy of the content of the password registers 22 is loaded to a lock register 24 of code security module 20. A comparator 26, using any form of combinatorial or sequential logic, compares the content of lock register 24 with the content of key register 28. If the content of lock register 24 matches the content of key register 28, code security module 20 instructs memory buffer 18 to permit the passage of data from memory 14 to processor core 12. If the content of lock register 24 does not match the content of key register 28, code security module 20 instructs memory buffer 18 to block the passage of data from memory 14 to processor core 12. In sum, to unlock the data path between memory 14 and processor core 12 requires a read of the password registers 22, a write to key register 28, and a successful comparison of the contents of lock register 24 and key register 28.

The data path 16 between memory 14 and processor core 12 must be unlocked or unsecure in certain stages of the development and operation of the semiconductor device. One environment for unsecure communication between the memory and processor core of the device is the debugging environment. During development, the data path should be unsecure to permit software development and debugging. Another environment for unsecure communication is the flash programming environment, which is common during code development and testing. Another environment for unsecure communication between memory and the processor core is any custom programming environment, including the use of on-chip boot code in a boot ROM to program flash memory and the execution of code from memory external to the device in a manner that requires access to flash memory. The process for unlocking or unsecuring the device is the same for all of the unlocking environments described and is shown in the password match flow diagram of FIG. 2.

Figure 2:
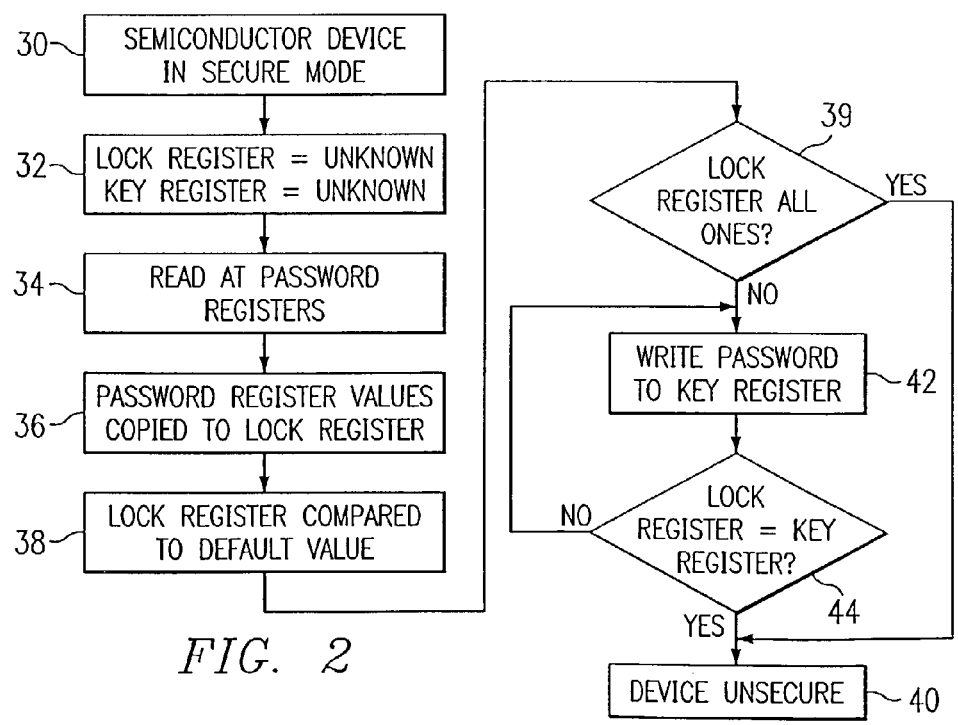
FIG. 2 is a flow diagram of the password match flow of the present invention.

The series of method steps shown in FIG. 2 is known as the password match flow. At step 30 of FIG. 2, the device is initially in a secure mode. As indicated at step 32, the value of the lock register 24 and key register 28 are unknown. At step 34, a read operation is performed of the password registers 22 of memory 24. The read operation of step 34 may be a so-called dummy read operation whose sole purpose is to place in the data path between memory 14 and memory buffer 18 the content of password registers 22 so that the content of the password registers can be captured and copied to lock register 24. At step 36, the content of password registers 22 is copied to lock register 24.

The length of the password, which determines the bit length of the password registers 22, lock register 24, and key register 28 can be selected such as part of a consideration of the time necessary to decipher the code through a trial and error approach versus the amount of memory and circuitry dedicated to storing and processing password data. It is found that a password having a bit length of 64 bits may be suitable in terms of the time necessary to decipher the code and the number of gates necessary to store and process the password data. A password having a bit length of 56 bits or 128 bits may also be suitable. In general, a password having a greater bit length will be more difficult to decipher using a trial and error approach. Although no one bit length preferred, longer bit lengths provide a time for deciphering the password that is theoretically humanly impossible.

At step 38, the content of lock registers is compared to a default condition of all ones. If the content of the lock register is determined at step 39 to be all ones, the device is unsecured as a default operation at step 40, allowing the processor core of the device to access memory 14. If the content of lock register 24 is not all ones, the password is written at step 42 to key register 28. At step 44, the content of lock register 24 is compared to the content of the key register 28. If the content of lock register 24 matches the content of key register 28, the device is unsecured at step 40. If the content of lock register 24 and the content of key register 28 are not identical, the password match flow of FIG. 2 loops to step 42 to accommodate, if desired, a subsequent write to key register 28.

The password match flow of FIG. 2 is applied regardless of the circumstances in which the device entered the secured mode. In an end-customer application, the device will operate in an unsecured mode, allowing the processor core to execute the program code stored in the memory space of the device.

While the device is in unsecure mode, coupling a code debugger, such as a JTAG device, to the semiconductor device immediately causes the code security module to place the device in secure mode. If the semiconductor device is reset such that the device is placed in a microprocessor mode, the device by default will be placed in a secure mode. The microprocessor mode of the device is characterized by the ability of the device to execute code from an external memory location, such as an external flash. In this scenario, the device is placed in a secure mode and must be unsecured for the processor core to access the non-volatile memory space of the device. Similarly, if the on-chip boot ROM is invoked, the device is switched to secure mode.

Once a final piece of application code is developed for use in an end-user semiconductor device, a password should be selected and written to the password registers of the memory space of the device. Prior to end-user distribution, the device will then be set to always reset or boot in application or run-time mode. As such, during the period that the device is in application mode, the device will be unsecure, permitting free communication between the processor core and the memory of the device. If however, a debugging tool is coupled to the device, or if the device is reset to boot such that the processor executes data from an external memory source or boot ROM, the device is immediately placed in a secure mode to prevent access to the memory of the device. As an alternative to selecting a password for the device and operating according to the security scheme described herein, a semiconductor device with the code security feature described herein can be operated without the code security functionality by setting the password registers in memory to all ones. If the password registers are set to all ones, the device will, as a default condition, switch from secure mode to unsecure mode upon any read of the password registers of memory.

It should also be recognized that other components of a semiconductor device may be secured by placing those components opposite the processor core on the secure data path. Code security module 20 and memory buffer 18 form a security checkpoint along data path 16. As such, any components located opposite processor core 12 on data path 16 may be placed in a secured mode or unsecured mode according to the teachings of the present invention. For example, if a semiconductor device 10 were designed such that a peripheral port could only communicate to processor core 18 through data path 16, the peripheral port could be secured or unsecured using the code security module 20 and memory buffer 18. The password for unsecuring access to the peripheral port would be stored in memory space 14 and compared in code security module 20 to a password written to key register 28. Using the techniques of the present invention, the secure data path 16 could be used to provide a limited access path for security purposes for any component located opposite processor core 12.

Although the present invention has been described in detail, it should be understood that various alterations, changes, modifications, and substitutions may be made to the teachings described herein without departing from the scope of the present invention, which is solely defined by the appended claims.

What is claimed is:

1. A method for controlling access by the processor core of a semiconductor device to the local memory of the semiconductor device, comprising the steps of:
    performing a read operation to a first memory location;
    placing the content of the first memory location on a data bus coupled between the semiconductor device and the local memory while preventing the processor core from accessing the content of the first memory location from the data bus;
    comparing the content of the first memory location to the content of a second memory location;
    and selectively permitting or preventing the processor core to receive data from the local memory responsive to the comparing step.

2. The method for controlling access by the processor core of a semiconductor device to the local memory of the semiconductor device of claim 1, wherein the step of performing a read operation to a first memory location comprises the step of reading a predefined memory location having preexisting password content.

3. The method for controlling access by the processor core of a semiconductor device to the local memory of the semiconductor device of claim 1, further comprising the step of writing the content of the first memory location to a password register; and
    wherein the step of comparing the content of the first memory location to the content of the second memory location comprises the step of comparing the content of the password register to the content of the second memory location.

4. The method for controlling access by the processor core of a semiconductor device to the local memory of the semiconductor device of claim 1, further comprising the step of writing the content of the first memory location to a password register; and
    wherein the step of comparing the content of the first memory location to the content of the second memory location comprises the step of comparing the content of the password register to the content of a key register.

5. The method for controlling access by the processor core of a semiconductor device to the local memory of the semiconductor device of claim 1, wherein the selectively permitting step comprises the step of receiving at a memory buffer a signal indicative of the comparison of the content of the first memory location to the content of the second memory location.

6. The method for controlling access by the processor core of a semiconductor device to the local memory of the semiconductor device of claim 1, further comprising the step of writing the content of the first memory location to a password register; and
    wherein the step of comparing the content of the first memory location to the content of the second memory location comprises the step of comparing the content of the password register to the content of a key register;
    wherein the selectively permitting step comprises the step of receiving at a memory buffer a signal indicative of the comparison of the content of the password register to the content of the key register.

7. The method for controlling access by the processor core of a semiconductor device to the local memory of the semiconductor device of claim 1, further comprising the step of permitting the processor core to receive data from the local memory regardless of the content of the second memory location if the content of the first memory location includes predefined default content.

8. The method for controlling access by the processor core of a semiconductor device to the local memory of the semiconductor device of claim 1, further comprising the step of permitting the processor core to receive data from the local memory regardless of the content of the second memory location if the content of the first memory location includes all ones.

9. A semiconductor device, comprising
a processor core;
memory;
a memory buffer positioned between the processor core and memory; and
wherein the memory buffer selectively allows or prevents data to pass between the memory and the processor core responsive to a comparison of a first set of data to a second set of data.

10. The semiconductor device of claim 9, wherein the first set of data comprises a first set of password data stored in memory.

11. The semiconductor device of claim 9,
wherein the first set of data comprises a first set of password data stored in memory;
wherein the second set of data comprises a second set of password data; and wherein the memory buffer allows data to pass from memory to the processor core if the first set of password data is identical to the second set of password data.

12. The semiconductor device of claim 9,
wherein the first set of data comprises a first set of password data stored in memory;
wherein the second set of data comprises a second set of password data; and
wherein the memory buffer blocks the passage of data from memory to the processor core if the first set of password data is not identical to the second set of password data.

13. The semiconductor device of claim 9,
wherein the first set of data comprises a first set of password data stored in memory;
wherein the second set of data comprises a second set of password data;
wherein the memory buffer blocks the passage of data from memory to the processor core if the first set of password data is not identical to the second set of password data; and
wherein access to other components of the semiconductor device is permitted despite the blockage of the passage of data from the memory to the processor core.

14. The semiconductor device of claim 9, wherein at least one other component of the semiconductor device is placed opposite the processor core such that the memory buffer is positioned between the processor core and the other component of the semiconductor device, such that the memory buffer allows data to pass between the memory and the other component of the semiconductor device following a comparison of a first set of data to a second set of data.

15. A semiconductor device, comprising
a processor core;
memory;
security logic;
a memory buffer positioned between the processor core and memory; and
wherein the memory buffer selectively allows or prevents data to pass between the memory and processor core responsive to a signal received from security logic; and
wherein the security logic generates the signal to the memory buffer on the basis of the content of password data.

16. The semiconductor device of claim 15,
wherein the security logic generates the signal to the memory buffer on the basis of the content of password data stored in the memory; and
wherein the password data is passed to the security logic following a read of the addresses of the password data in the memory.

17. The semiconductor device of claim 15,
wherein the security logic generates the signal to the memory buffer on the basis of the content of password data stored in the memory;
wherein the password data is passed to the security logic following a read of the addresses of the password data in the memory; and
wherein the security logic generates the signal to the memory buffer indicating that the memory buffer should allow data to pass between the memory and the processor core if the password data includes predefined content.

18. The semiconductor device of claim 15,
wherein the security logic generates the signal to the memory buffer on the basis of the content of password data stored in the memory;
wherein the password data is passed to the security logic following a read of the addresses of the password data in the memory; and
wherein the security logic generates the signal to the memory buffer indicating that the memory buffer should allow data to pass between the memory and the processor core if the password data includes all ones.

19. The semiconductor device of claim 15,
wherein the security logic generates the signal to the memory buffer on the basis of the content of password data stored in the memory;
wherein the password data is passed to the security logic following a read of the addresses of the password data in the memory; and
wherein the security logic generates the signal to the memory buffer indicating that the memory buffer should allow data to pass between the memory and the processor core if the password data is identical to a second set of password data.

20. The semiconductor device of claim 15,
wherein the security logic generates the signal to the memory buffer on the basis of the content of password data stored in the memory;
wherein the password data is passed to the security logic following a read of the addresses of the password data in the memory; and
wherein the security logic generates the signal to the memory buffer indicating that the memory buffer should not allow data to pass between the memory and the processor core if the password data is not identical to a second set of password data.

21. The semiconductor device of claim 15,
wherein the security logic generates the signal to the memory buffer on the basis of the content of password data stored in the memory;
wherein the password data is passed to the security logic following a read of the addresses of the password data in the memory;
wherein the security logic generates the signal to the memory buffer indicating that the memory buffer should not allow data to pass between the memory and the processor core if the password data is not identical to a second set of password data; and
wherein access to other components of the semiconductor device is permitted.

22. A semiconductor device of claim 15, further comprising,
a semiconductor device component coupled to the memory such that the memory buffer is positioned between the semiconductor device component and the processor core; and wherein the memory buffer allows data to pass between the semiconductor device component and processor on the basis of a signal received from security logic.

23. A method for securing a semiconductor device to prevent access to data on a local memory of the semiconductor device, comprising the steps of:

executing a read operation in the processor core of the device, the read operation directed to a predefined location in the memory housing a first set of password data;

copying the first set of password data to a first password register;

comparing the first set of password data of the first password register to a second set of password data; and transmitting a data pass signal to a memory buffer between the processor core and the memory if the first set of password data is identical to the second set of password data.

24. The method for securing a semiconductor device to prevent access to data on a local memory of the semiconductor device of claim 23, wherein the first set of password data and the second set of password data are at least 56 bits.

* * * * *